United States Patent [19]

Mandel et al.

[11] Patent Number: 5,548,004
[45] Date of Patent: *Aug. 20, 1996

[54] METHOD OF PREPARING COATING MATERIALS

[75] Inventors: Frederick S. Mandel, Chagrin Falls; Charles D. Green, Hudson; Anthony S. Scheibelhoffer, Norton, all of Ohio

[73] Assignee: Ferro Corporation, Cleveland, Ohio

[*] Notice: The term of this patent shall not extend beyond the expiration date of Pat. No. 5,399,597.

[21] Appl. No.: 371,242

[22] Filed: Jan. 11, 1995

Related U.S. Application Data

[63] Continuation of Ser. No. 236,882, Apr. 29, 1994, Pat. No. 5,399,597, which is a continuation of Ser. No. 970,401, Nov. 2, 1992, abandoned.

[51] Int. Cl.$^6$ ................ C08F 6/10; C08J 3/12; C08K 5/04
[52] U.S. Cl. ............ 523/342; 523/307; 523/340; 524/904; 528/501; 239/8; 521/78
[58] Field of Search .............. 521/78; 528/501; 523/307, 340, 342; 524/904; 239/8

[56] References Cited

U.S. PATENT DOCUMENTS

| | | | |
|---|---|---|---|
| 3,981,957 | 9/1976 | van Brederode et al. | 260/878 R |
| 4,012,461 | 3/1977 | van Brederode | 260/878 R |
| 4,582,731 | 4/1986 | Smith | 427/421 |
| 4,734,227 | 3/1988 | Smith | 264/13 |
| 4,734,451 | 3/1988 | Smith | 524/493 |
| 4,970,093 | 11/1990 | Sievers et al. | 427/38 |
| 5,009,367 | 4/1991 | Nielsen | 239/3 |
| 5,027,742 | 7/1991 | Lee et al. | 118/300 |
| 5,290,827 | 3/1994 | Shine | 523/340 |
| 5,387,619 | 2/1995 | Lee et al. | 521/133 |

OTHER PUBLICATIONS

Karen A. Larson et al., "Evaluation of Supercritical Fluid Extraction in the Pharmaceutical Industry," Biotechnology Progress, vol. 2, No. 2, Jun. 1986, pp. 73–82.

G A M Diepen et al., "The Solubility of Naphthalene in Supercritical Ethylene," Dec. 1948, pp. 4085–4089.

Mark McHugh et al., "Solid Solubilities of Naphthalene and Biphenyl in Supercritical Carbon Dioxide," Journal of Chemical Engineering Data, vol. 25, No. 4, 1980, pp. 326–329.

Hongju Chang et al., "Solubilities of Methoxy-1-tetralone and Methyl Nitrobenzoate Isomers and Their Mixtures in Supercritical Carbon Dioxide," Journal of Chemical Engineering Data, vol. 30, No. 1, 1985, pp. 74–78.

Ronald T. Kurnik et al., "Solubility of Solids in Supercritical Carbon Dioxide and Ethylene," Journal of Chemical and Engineering Data, vol. 26, No. 1, 1981, pp. 47–51.

Yu V. Tsekhanskaya et al., "Volume Changes in Naphthalene Solutions in Compressed Carbon Dioxide," Russian Journal of Physical Chemistry, vol. 40, No. 9, Sep. 1966, pp. 1152–1156.

Walter Cobbs et al., "High Solids Coatings Above 80% by vol.," presented at the Water–Borne & Higher Solids Coatings Symposium, Mar. 10–12, 1980, New Orleans, LA, pp. 175–192.

*Primary Examiner*—Paul R. Michl
*Assistant Examiner*—Andrew E. C. Merriam
*Attorney, Agent, or Firm*—Rankin, Hill, Lewis & Clark

[57] ABSTRACT

The present invention provides a new and improved method of producing coating materials comprising the steps of providing a first organic material which is solid at room temperature, providing a second organic material which is solid at room temperature and which is substantially different in chemical composition from the first organic material, providing a source of supercritical fluid, providing a first container having a mechanical agitator, providing a second container, introducing the first and second organic materials and the supercritical fluid into the first container and mechanically agitating such materials and the supercritical fluid, and discharging the contents of the first container into the second container so as to collect substantially all of the first and second organic materials in the second vessel, the second container being maintained at a lower pressure than the first container.

14 Claims, 1 Drawing Sheet

5,548,004

METHOD OF PREPARING COATING MATERIALS

This is a continuation of application Ser. No. 08/236,882 filed on Apr. 29, 1994, which is now U.S. Pat. No. 5,399,597, which is a continuation of application Ser. No. 07/970,401 filed Nov. 2, 1992, now abandoned.

TECHNICAL FIELD

This invention concerns coating materials and specifically coating powders. These coating powders are utilized to impart a decorative and/or functional coating or finish to objects of manufacture. More particularly, the invention concerns a new and improved method of utilizing a process media such as a supercritical fluid in the manufacture of coating powders.

BACKGROUND

Coating powders (also known in the Industry as powder coatings) are a mixture of fine particles that are utilized to provide a protective coating on an object. Such powders comprise a mixture of thermoplastic or thermosetting polymeric resin materials, pigments, cross-linking agents, catalysts, flow aids and other materials.

Currently, coating powders are generally used by applying such powders to the object being coated using electrostatic powder spray or fluidized bed coating equipment. In the electrostatic process, the coating powder is dispersed in an airstream and passed through a high voltage field where the particles pick up an electrostatic charge. The charged particles are attracted to and deposited on the object to be coated which is usually at room temperature. The object is then placed in an oven where the powder melts, cures and forms a coating on the object. In fluidized bed applications the object to be coated is heated to a temperature above the curing temperature of the coating powders. This heated object is then passed through an air fluidized cloud of the coating powders. The coating powders melt and cure as they come into contact with the hot object. Coating powders are generally utilized to produce coatings with film thicknesses of about 0.8 to 50 mils.

Coating powders are generally produced by first dry mixing the various constituents that form the powder (e.g., a base resin, a curing agent, pigments, flow agents). This mixture is then fed into a suitable melt mixer such as a twin screw extruder which melt mixes the constituents at an elevated temperature (e.g., about 250°–400° F.). The molten mixture which is produced by the extruder is then cooled by use of chill rollers and mechanically flaked. Finally, the flaked material is milled in an air classification mill to an average particle size of about 20–50 µm.

The conventional processing of coating powders does present some downsides. For example, the high temperature processing in the extruder can bring about the premature reaction of the curing agent or the degradation of the polymer resins. Additionally, the particles produced by the conventional method tend to vary greatly in size thereby requiring the use of various particle separation techniques such as screening and/or cyclone separation in order to separate undesirable large and small particles. Particles of undesirable size must then be downgraded or disposed of. The conventional method can produce particles that do not display uniformity in composition. For example, some particles may contain excess pigment while other particles may contain too little pigment. The conventional process also presents a drawback in that there is a limit to the amount of raw materials that can be mixed at one time. More particularly, most conventional processing equipment can only handle about 2000 pounds of material during the dry mixing operation.

SUMMARY OF THE INVENTION

The present invention provides a new and improved method of producing coating powders that affords various distinct advantages over prior art processing techniques. More particularly, the present inventive process produces particles of more uniform size and homogeneous composition. Also, during the process there is substantially no undesirable reaction of curing agents or degradation of the polymer resins since the process operates at lower temperatures. Accordingly, the invention allows the use of resins and curing agents that are not suitable for use in conventional extruder-type processes because of heat sensitivity. Additionally, it is contemplated that larger batch sizes, that are well in excess of conventional batch sizes, can be produced. Further, coating powders produced in accordance with the present invention exhibit particles that are more "spherical" in shape as compared to prior art coating powders. Spherical particles are generally preferred for electrostatic application since they can achieve the maximum charge to mass ratio.

In one preferred embodiment the invention includes the steps of providing a first solid organic material that is a solid at room temperature (23° C.), a second solid organic material that is a solid at room temperature which is substantially different in chemical composition from the first material, a source of supercritical fluid, a first container having a mechanical agitator and a second container. The first and second organic materials are introduced into the first container along with the supercritical fluid and mechanically agitated. Then, the contents of the first container are discharged into the second container with the second container maintained at a lower pressure than the first container.

The first organic material preferably comprises a polymeric resin and the second organic material preferably comprises a curing agent or a second resin. The supercritical fluid preferably comprises carbon dioxide. As used in the specification and the claims below the terminology "organic material" means any material containing carbon (C) to carbon bonds. Preferably, the first container is substantially free of any solvent that is capable of dissolving the first or second organic material to any appreciable degree at room temperature (23° C.) and pressure (1 atmosphere).

The foregoing and other features of the invention are hereinafter more fully described and particularly pointed out in the claims below. The following description sets forth in detail certain illustrative embodiments of the invention, these being indicative, however, of but a few of the various ways in which the principles of the invention may be employed.

DETAILED DESCRIPTION

Figure 1:
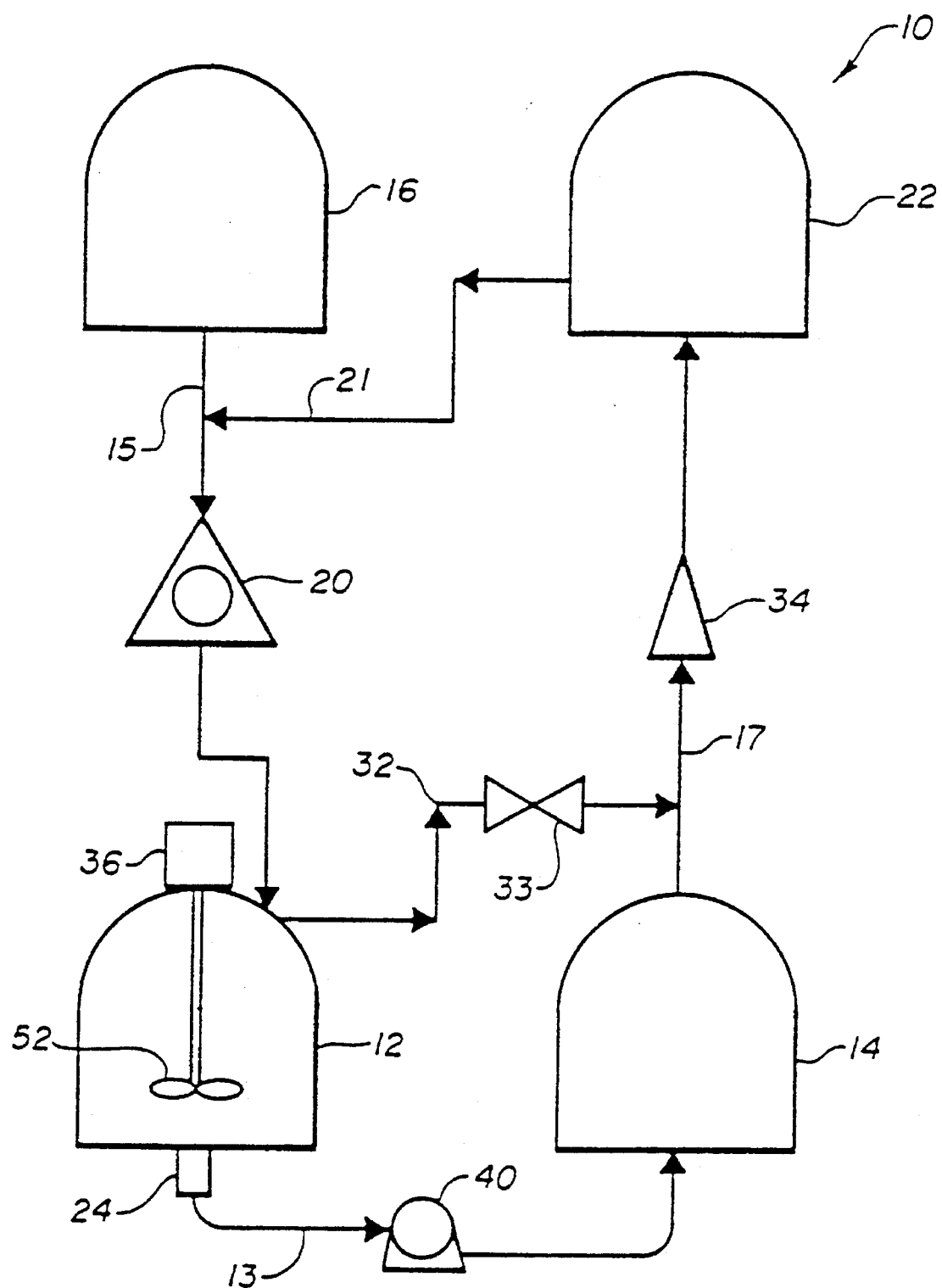
FIG. 1 is a schematic view of an apparatus suitable for use in the present invention.

Referring to FIG. 1 there is schematically shown an apparatus 10 for use in practicing applicants' novel invention. More particularly, there is shown a primary pressure vessel 12 which is connected by piping 13 to a receiver vessel 14. Connected by piping 15 to the pressure vessel 12 is a source of gas 16. Gas 16 is preferably fed under pressure into vessel 12 using a compressor or liquid pump 20. The receiver vessel 14 is connected by piping 17 to a return tank 22. The return tank 22 is connected by piping 21 to the source of gas 16.

Pressure vessel 12 includes, preferably at its base, a valve 24 for facilitating the emptying of the contents of the pressure vessel 12 into the receiver vessel 14. Included near the top portion of the pressure vessel 12 is the inlet of piping 32 which is connected to piping 17. Included in piping 32 is a control valve 33. Included in piping 17 is a compressor 34 that serves to compress and transfer gas emanating from the pressure vessel 12 or the receiver vessel 14 into the return tank 22.

Pressure vessel 12 includes a sealable opening or access port that allows materials to be charged therein and a mechanical stirring device 36 for mechanically agitating and stirring the contents of pressure vessel 12. Receiving vessel 14 also includes a sealable opening or access port that allows materials contained therein to be sampled or removed. Preferably, both vessels 12 and 14 are equipped with a quick-opening, breech-lock system that requires no hand tools to open and close. Also, preferably vessel 12 includes some type of valve configuration having a feed port that facilitates the quick addition of minor amounts of material (e.g., pigments) to the vessel 12 once it has been pressurized. Further, preferably vessel 14 includes some type of conveyance device to facilitate quick unloading of the materials from the vessel 14.

Pressure vessel 12 and receiving vessel 14 are preferably made of stainless steel. However, it will be appreciated that any number of alternative materials may be utilized, such as, for example, nickel-coated carbon steel or carbon steel vessels having other appropriate chemically inert inserts or liners.

Apparatus 10 is employed in accordance with the present invention by first charging the starting materials for the coating powder which one desires to produce into the pressure vessel 12. Pressure vessel 12 is then sealed and isolated. Gas from source 16 is then fed into vessel 12 via piping 15 until a suitable pressure is attained in vessel 12. A critical temperature can be attained by heating vessel 12, heating the liquid/gas stream as it enters vessel 12, agitating vessel 12 or combinations thereof. The pressure and temperature in vessel 12 converts the gas into a supercritical fluid or other suitable process media. Pressure of from about 350 psi to about 20,000 psi may be utilized. When employing a gas such as $CO_2$, a pressure of from about 550 psi to about 7000 psi is utilized, and preferably from about 950 psi to about 5000 psi, and more preferably from about 1080 psi to about 4500 psi is utilized. Of course, it will be appreciated that the particular pressure utilized will be a function of such variables as the temperature of the vessel 12 and the particular gas utilized.

Once vessel 12 is pressurized, agitation device 36 is then energized and the starting materials and the supercritical fluid are then thoroughly mixed. Vessel 12 includes an internal temperature of from about −85° C. to about 200° C. When utilizing $CO_2$, a temperature from about 15° C. to about 160° C. is employed, and preferably from about 20° C. to about 150° C., and more preferably from about 31° C. to about 100° C. Of course, it will be appreciated that the particular temperature utilized will be a function of various variables such as, for example, the gas utilized, the composition of the starting materials, pressures employed and equipment configurations. Preferably, vessel 12 is held below the melting point of the materials being processed, such as, the polymer resins. The temperature in vessel 12 preferably is in the range of from about 5 degrees below the Tg (i.e., glass transition temperature) of at least one of the materials being processed up to about the melting point of such one material. In the case of an amorphous material, "melting point" means the temperature at which the material becomes wholly fluid. It is believed that a supercritical fluid will suppress the Tg of most materials.

It will be appreciated that in order to attain the desired temperature in vessel 12, such vessel may be equipped with heat exchangers or other suitable heating/cooling means.

The starting materials are mixed in vessel 12 for a period of about 1 to about 480 minutes, preferably 5 to about 300 minutes and more preferably from about 30 to about 240 minutes.

Once the starting materials have been thoroughly mixed, valve 24 is then opened and maintained in the open position until such time that substantially all of the starting materials originally contained in pressure vessel 12 have been transferred into receiver vessel 14 (which is maintained at a lower pressure than vessel 12). Once substantially all of the starting materials have been transferred, valve 33 is opened in order to depressurize vessel 12 and allow the flow of gas into return tank 22. The gas is then transferred via piping 21 to piping 15 and made available for purposes of reuse.

While the solid materials are being transferred to receiver vessel 14, vessel 14 is held at preferably a constant and lower pressure than pressure vessel 12. Accordingly, preferably the gas and the starting materials enter receiver vessel 14 at a very high rate. Vessel 14 includes a temperature of from about −85° C. to about 220° C., preferably from about −18° C. to about 160° C., and more preferably from about 0° C. to about 130° C. As with vessel 12, in order to maintain the desired temperature in vessel 14, heat exchangers or other cooling/heating devices may be necessary. Preferably, vessel 14 is held at a temperature below the melting point of the materials being processed. Vessel 14 is held at a pressure of from about 0 psi to about 5000 psi, preferably, from about 100 psi to about 2000 psi, and more preferably from about 150 psi to about 1000 psi. Once again, it will be appreciated that the particular pressure and temperature utilized in vessel 14 is a function of various variables, such as, for example, the particular gas utilized, the composition of the starting materials and equipment configurations.

Preferably, the length of piping 13 is minimized as much as possible. Disposed in piping 13 just prior to receiver vessel 14 is preferably a header 40 that includes multiple nozzles through which the gas and/or supercritical fluid and starting materials are sprayed. Preferably, header 40 is located within receiver vessel 14 or immediately adjacent receiver vessel 14. Any number of nozzles may be employed to spray the material. Of course, it will be appreciated that the selection of the proper nozzle will be a function of various parameters, such as, for example, the pressures employed in vessel 12, the size of particles desired, flow rates, the materials being processed, and the gas being utilized.

The spray nozzles have an orifice opening of from about 0.001" to about 1", preferably from about 0.005" to about 0.5" and more preferably from about 0.01" to about 0.1". Examples of potential suitable spray nozzles are hydraulic atomizing nozzles sold by Spraying Systems Co. of Wheaton, Ill.

Agitation device 36 comprises an electric motor 50 driving a mixer 52. Mixer 52 may comprise any number of conventional mixing devices. Of course, it will be appreciated that the selection of the proper mixer will be a function of various parameters, such as, for example, the size of motor 50, the materials being mixed, the configuration of the vessel 12, the gas being utilized and the pressures employed in vessel 12. Examples of suitable mixers are Cowles blade mixers sold by Indco, Inc. of New Albany, Ind. Additional types of mixing blades may also be utilized such as pitched-blade turbine mixers, high-efficiency turbine mixers, disk-style turbine mixers, straight-blade turbine mixers, anchor impeller mixers and helix impeller mixers. Additionally, more than one mixing blade may be utilized in vessel 12. For example, a pair of spaced turbine impeller mixers turning in opposite directions may be utilized. Additionally, for example, an anchor-type impeller mixer could be utilized in conjunction witch the two turbine impeller mixers. It will be appreciated that the present invention preferably provides for both distributive and dispersive mixing.

The present invention contemplates the use of various process medias (liquids and gases). However, preferably, the process media is one which is capable of achieving a supercritical state. As used herein and in the claims below the term "supercritical fluid" means a material, that at specific temperatures and pressures, no longer displays the properties of either a gas or a liquid. Examples of potential supercritical fluids suitable for use with the present invention include, for example, carbon dioxide, water, nitrous oxide, methane, ethane, ethylene, propane, pentane, benzene, methanol, ethanol, isopropanol, various fluorocarbons such as chlorotrifluoromethane and monofluoromethane, toluene, pyridine, cyclohexane, decalin, cyclohexanol, o-xylene, and tetralin. The critical properties for these compounds are set forth below. The present invention contemplates the use of these compounds either by themselves or in combination. Additionally, it will be appreciated that solvents such as, for example, acetone, ketones, or ethers may be utilized in conjunction with the compounds listed below. However, generally, the use of such solvents is not desired.

| Compound | Critical Temperature (°C.) | Critical Pressure (atm) |
| --- | --- | --- |
| $CO_2$ | 31.3 | 72.9 |
| $H_2O$ | 374.15 | 218.3 |
| $N_2O$ | 36.5 | 71.7 |
| Methane | −82.1 | 45.8 |
| Ethane | 32.28 | 48.1 |
| Ethylene | 9.21 | 49.7 |
| Propane | 96.67 | 41.9 |
| Pentane | 196.6 | 33.3 |
| Benzene | 288.9 | 48.8 |
| Methanol | 240.5 | 78.9 |
| Ethanol | 243.0 | 63.0 |
| Isopropanol | 235.3 | 47.0 |
| Isobutanol | 275.0 | 42.4 |
| Chlorotrifluoromethane | 28.0 | 38.7 |
| Monofluoromethane | 44.6 | 58.0 |
| Toluene | 320.0 | 40.6 |
| Pyridine | 347.0 | 55.6 |
| Cyclohexane | 280.0 | 40.2 |
| Decalin | 391.0 | 25.8 |
| Cyclohexanol | 356.0 | 38.0 |
| o-Xylene | 357.0 | 35.0 |
| Tetralin | 446.0 | 34.7 |

One compound that appears to be particularly well suited for use with the present invention is carbon dioxide ($CO_2$). Carbon dioxide is preferred because it is nonflammable, reasonably priced, and is easily separated or removed from the constituents used in making coating powders at the contemplated temperatures and pressures. Therefore, there will be no residual $CO_2$ in the finished product that could contribute to defects upon application of the coating powder. However, it will be appreciated that the particular gas employed in a particular process will vary depending on such factors as, for example, the availability and cost of the gas, safety concerns, working pressures and temperatures.

Any number of process medias may be used to produce the coating powders in accordance with the principles of the present invention. However, generally, care must be taken not to utilize starting materials which are soluble in the process media at operating temperatures and pressures. More particularly, if the starting materials are soluble in the process media, it will not be possible to transfer the starting materials to the receiver vessel 14 without losing starting materials to the process media storage tank 22, which would be a very undesirable result.

Examples of starting materials suitable for use in the present invention are thermoplastic base resins such as, for example, PVC homopolymer resins, polyamide resins, polyethylene resins, polypropylene resins, cellulose esters, polyester resins, ethylenechlorotrifluoroethylene resins, poly(vinylidene fluoride) resins, poly(phenylene sulfide) resins, and thermoset resins, such as, for example, epoxy resins, polyurethane resins, hydroxy and carboxy functional thermoset polyester resins and acrylic resins. Curing agents such as, for example, dicyanamide type, phenolic formaldehyde, polyamine type, TGIC, beta hydroxy alkyl amide types, tetramethoxymethyl glycoluril and glycidyl functional acrylic resins may also be employed when thermoset base resins are utilized. Flow control agents such as, for example, polyacrylates, silicones, waxes and cellulose acetate butyrate may also be employed. When utilizing thermoplastic resins, plasticizers such as, for example, styrene maleic anhydride and -di-butyl thalate may be utilized. Stabilizers such as, for example, tetrakis(methylene (3,5-di-tert-butylhydroxyhydrocinnamate)) zinc compounds, tin compounds and polyols may also be utilized. Extenders or extender pigments such as, for example, barium sulfate and calcium carbonate may also be utilized. Both organic and inorganic pigments may be included to impart color, opacity and other visual qualities to the coating produced with the coating powders.

When $CO_2$ gas is utilized, $CO_2$ is charged to or utilized in vessel 12 so as to provide from about 10 percent by weight to about 90 percent by weight $CO_2$ and from about 90 percent by weight to about 10 percent by weight starting materials, preferably from about 15 percent by weight to about 85 percent by weight $CO_2$ and from about 85 percent by weight to about 15 percent by weight starting materials, and more preferably from about 20 percent by weight to about 80 percent by weight $CO_2$ and from about 80 percent by weight to about 20 percent by weight starting materials.

Subsequent to processing, the materials in vessel 14 are a collection of homogeneous uniform size particles. In the event any oversize particles or a conglomeration of particles (foam) are contained in vessel 14, they may be easily milled to the desired size.

By way of illustration and not by any limitation, the following example will describe a method of producing coating powders within the scope of the present invention. Unless otherwise indicated, all parts and percentages are by weight and all temperatures are in degrees Centigrade (°C.). For purposes of facilitating a better understanding of the invention, the following example makes reference to the various elements of FIG. 1.

EXAMPLE

A mixture of the following starting materials is charged into a pressure vessel 12. Vessel 12 is a 30 gallon stainless steel vessel having an inner diameter of 15 inches.

| Component | % by Weight |
|---|---|
| Resin[1] | 56.1 |
| Stabilizer[2] | .10 |
| Pigment[3] | 1.1 |
| Curing Agent[4] | 4.5 |
| Flow Additive[5] | .2 |
| Extender[6] | 38.0 |

[1] Araldite 3010 Polyester Resin
[2] Anox PP18 Stabilizer
[3] $TiO_2$
[4] TGIC (Triglycidylisocyanurate)
[5] Polyethylene Homopolymer
[6] Barytes 1-Pfizer ($BaSO_4$)

Pressure vessel 12 is then filled with carbon dioxide from source 16 until a pressure of about 2800 psi (80° C.) is attained within vessel 12 thereby rendering the carbon dioxide a supercritical fluid. The source 16 of carbon dioxide is a standard commercial source maintained at a temperature of about −18° C. and a pressure of about 300 psi. Sufficient starting materials are utilized in vessel 12 so as to provide in vessel 12 with 70 percent by weight $CO_2$ and 30 percent by weight starting materials. Once vessel 12 has been properly isolated the materials and supercritical fluid are then mixed for about 60 minutes using agitation device 34. A high torque 30 hp electric motor 50 and a mixer 52 comprising a 6 inch Cowles blade are employed. The mixer is maintained at a depth of 3 cm from the bottom of pressure vessel 12 and is rotated at a rate of about 750 rpm for thirty minutes. A conventional controlled heating/cooling system is utilized to provide a temperature of about 80° C. in vessel 12 during the mixing operation.

Upon completion of mixing the starting materials into a homogeneous product, valve 24 is opened and the homogeneous product is then sprayed through header 40 into receiver vessel 14. Receiver vessel 14 is a 120 gallon stainless steel vessel having an inner diameter of about 30 inches. Receiving vessel 14 is maintained at a back pressure of about 300 psi. Piping 13 is about one inch in inner diameter and has a total length of about three inches and header 40 is located within receiver vessel 14. Header 40 includes six separate nozzles arranged in a parallel fashion. The nozzles are hydraulic atomization nozzles having orifice openings of 0.02 inches. No temperature control devices are utilized in connection with receiver vessel 14.

Once all of the homogeneous product is transferred to receiver vessel 14, the pressure vessel 12 is fully depressurized of carbon dioxide using piping 30 and compressor 34, and the carbon dioxide is then transferred to storage tank 22 where it is available for reuse. Pressure vessel 12 is then also available for reuse. Subsequently, the receiver vessel 14 is depressurized using piping 17 and compressor 34 and the carbon dioxide contained in vessel 14 is transferred to storage tank 22 for reuse. The receiver vessel 14 is then opened and the homogeneous product is then removed. When removed from vessel 14, the homogeneous product comprises generally a conglomeration of flake-type and rounded particles having an average diameter of about 40 µm.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

What is claimed:

1. A method of producing coating powders comprising the steps of:

(A) providing a first vessel having a motor driven mixer;

(B) providing a second vessel;

(C) providing a source of supercritical $CO_2$ gas;

(D) charging such first vessel with starting materials consisting essentially of a polymeric resin and a flow control agent both of which are solid at room temperature, such first vessel being substantially free of any solvent that is capable of dissolving such polymeric resin to any appreciable degree at 23° C. and 1 atmosphere;

(E) supplying such supercritical $CO_2$ gas to such first vessel, such that such first vessel contains from about 10 percent by weight to about 90 percent by weight such $CO_2$ gas and from about 10 percent by weight to about 90 percent by weight such starting materials;

(F) mechanically mixing such starting materials and such supercritical $CO_2$ gas in such first vessel utilizing such mixer for a period of from about 1 minute to about 480 minutes; and (G) transferring such mixture of such $CO_2$ gas and such starting materials from such first vessel through a header and into such second vessel, such header comprising multiple nozzles having an orifice diameter of from about 0.01" to about 1", such second vessel being maintained at an internal pressure of from about 0 psi to about 5000 psi and a temperature of from about −85° C. to about 200° C. during said transferring step.

2. A method as set forth in claim 1 wherein during said step (F) such first vessel is maintained at a temperature below the melting point of such starting materials.

3. A method as set forth in claim 1 wherein at least a portion of such $CO_2$ gas is collected from such second container during said step (G) for purposes of reuse.

4. A method as set forth in claim 1 wherein at least a portion of such $CO_2$ gas is collected from such first container for purposes of reuse.

5. A method as set forth in claim 1 wherein such starting materials after said step (G) comprise a foam comprising a conglomeration of particles, and such $CO_2$ gas is present in such first vessel during said step (F) at a pressure of from about 550 psi to about 7000 psi.

6. A method as set forth in claim 1 wherein such starting materials further include at least one material selected from the group consisting of a pigment, a filler and an extender.

7. A method as set forth in claim 1 wherein during said step (F) such $CO_2$ gas is held at a temperature of from about 5° C. below the Tg of such polymeric resin up to about the melting point of such polymeric resin.

8. A method as set forth in claim 1 wherein during said step (F) the temperature of such $CO_2$ gas is such that there is substantially no reaction between such flow control agent and such polymeric resin.

9. A method as set forth in claim 1 wherein during said step (F) such $CO_2$ gas is held at a temperature of from about 15° C. to about 160° C. and a pressure of from about 950 psi to about 5000 psi.

10. A method as set forth in claim 1 wherein during said step (F) such $CO_2$ gas is held at a pressure of from about 1080 psi to about 4500 psi and a temperature of from about 31° C. to about 100° C.

11. A method as set forth in claim 1 wherein during said step (G) such second vessel is maintained at a temperature of from about −18° C. to about 160° C. and a pressure of from about 100 psi to about 2000 psi.

12. A method as set forth in claim 1 wherein during said step (G) such second vessel is maintained at a temperature of from about 0° C. to about 130° C. and a pressure of from about 150 psi to about 1000 psi.

13. A method as set forth in claim 5 including the step of:
(H) milling such foam produced during said step (G).

14. A method as set forth in claim 1 wherein said flow control agent comprises a material selected from the group consisting of a polyacrylate, a silicone, a wax and cellulose acetate butyrate.

* * * * *